United States Patent
Chen et al.

(10) Patent No.: US 11,146,815 B2
(45) Date of Patent: *Oct. 12, 2021

(54) METHOD AND APPARATUS OF ADAPTIVE BI-PREDICTION FOR VIDEO CODING

(71) Applicant: MEDIATEK INC., Hsinchu (TW)

(72) Inventors: Ching-Yeh Chen, Taipei (TW);
Tzu-Der Chuang, Zhubei (TW);
Chih-Wei Hsu, Hsinchu (TW);
Yu-Wen Huang, Taipei (TW)

(73) Assignee: MEDIATEK INC., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/924,478

(22) Filed: Jul. 9, 2020

(65) Prior Publication Data
US 2020/0344491 A1  Oct. 29, 2020

Related U.S. Application Data

(63) Continuation of application No. 15/848,154, filed on Dec. 20, 2017, now Pat. No. 10,750,203.

(Continued)

(51) Int. Cl.
*H04N 19/577* (2014.01)
*H04N 19/176* (2014.01)
(Continued)

(52) U.S. Cl.
CPC ......... *H04N 19/577* (2014.11); *H04N 19/109* (2014.11); *H04N 19/176* (2014.11);
(Continued)

(58) Field of Classification Search
None
See application file for complete search history.

(56) References Cited

U.S. PATENT DOCUMENTS 9,681,138 B2    6/2017  Tanizawa et al.
10,728,572 B2 *  7/2020  Lee ...................... H04N 19/513
(Continued)

OTHER PUBLICATIONS

Chen, X., et al.; "Decoder-Side Motion Vector Refinement Based on Bilateral Template Matching;" Joint Video Exploration Team (JVET) of ITU-T SG 16 WP 3 and ISO/IEC JTC 1/SC 29/WG 11; Oct. 2016; pp. 1-4.

(Continued)

*Primary Examiner* — Tyler W. Sullivan
(74) *Attorney, Agent, or Firm* — McClure, Qualey & Rodack, LLP

(57) ABSTRACT

A method of video coding using generalized bi-prediction (GBi) receives input data associated with a current block in a current picture, wherein the input data comprises information associated with a block size of the current block, determines a set of weighting factor pairs, wherein a size of the set of weighting factor pairs depends on the block size of the current block, and derives a set of advanced motion vector prediction (AMVP) candidate lists comprising MVP (motion vector prediction) candidates. The method further derives a set of final motion information based on the MVP candidates, determines that the set of final information comprises a bi-prediction predictor, generates a final predictor by combining two reference blocks associated with the final motion information using a target weighting factor pair selected from the set of weighting factor pairs, and encodes or decoding the current block using the final predictor.

5 Claims, 7 Drawing Sheets

Related U.S. Application Data

(60) Provisional application No. 62/437,763, filed on Dec. 22, 2016.

(51) Int. Cl.
*H04N 19/513* (2014.01)
*H04N 19/52* (2014.01)
*H04N 19/109* (2014.01)
*H04N 19/523* (2014.01)
*H04N 19/537* (2014.01)
*H04N 19/44* (2014.01)

(52) U.S. Cl.
CPC ........... *H04N 19/44* (2014.11); *H04N 19/513* (2014.11); *H04N 19/52* (2014.11); *H04N 19/523* (2014.11); *H04N 19/537* (2014.11)

(56) References Cited

U.S. PATENT DOCUMENTS

| | | |
|---|---|---|
| 2012/0128060 A1 | 5/2012 | Lin et al. |
| 2014/0294078 A1 | 10/2014 | Seregin et al. |
| 2015/0312588 A1 | 10/2015 | Yamamoto et al. |
| 2016/0323573 A1 | 11/2016 | Ikai |
| 2017/0332095 A1 | 11/2017 | Zou et al. |
| 2018/0241998 A1 | 8/2018 | Chen et al. |
| 2018/0262773 A1 | 9/2018 | Chuang et al. |
| 2018/0309990 A1 | 10/2018 | Alshina et al. |
| 2018/0332298 A1 | 11/2018 | Liu et al. |
| 2019/0215531 A1 | 7/2019 | Lee et al. |
| 2019/0230350 A1 | 7/2019 | Chen et al. |
| 2019/0230364 A1 | 7/2019 | Lee et al. |
| 2019/0238880 A1 | 8/2019 | Lee |
| 2019/0246131 A1 | 8/2019 | Park et al. |

OTHER PUBLICATIONS

Chen, C.C., et al.; "Generalized bi-prediction for inter coding;" Joint Video Exploration Team (JVET) of ITU-T SG 16 WP 3 and ISO/IEC JTC 1/SC 29/WG 11; May-Jun. 2016; pp. 1-4.

* cited by examiner

METHOD AND APPARATUS OF ADAPTIVE BI-PREDICTION FOR VIDEO CODING

CROSS REFERENCE TO RELATED APPLICATIONS

The present invention is a Continuation of U.S. Utility patent application Ser. No. 15/848,154, filed on Dec. 20, 2017, which claims priority to U.S. Provisional Patent Application Ser. No. 62/437,763, filed on Dec. 22, 2016. The U.S. Provisional Patent Application is hereby incorporated by reference in its entirety.

FIELD OF THE INVENTION

The present invention relates to motion compensation using generalized bi-prediction (GBi) for Inter coding. In particular, the present invention relates to extended GBi techniques that support decoder-side motion derivation Inter coding tools to further improve GBi coding performance.

BACKGROUND AND RELATED ART

In a typical video coding system utilizing motion-compensated Inter prediction, motion information is usually transmitted from an encoder sider to a decoder so that the decoder can perform the motion-compensated Inter prediction correctly. In such systems, the motion information will consume some coded bits. In order to improve coding efficiency, a decoder-side motion vector derivation method is disclosed in VCEG-AZ07 (Jianle Chen, et al., *Further improvements to HMKTA-1.0*, ITU—Telecommunications Standardization Sector, Study Group 16 Question 6, Video Coding Experts Group (VCEG), $52^{nd}$ Meeting: 19-26 Jun. 2015, Warsaw, Poland). According to VCEG-AZ07, the decoder-side motion vector derivation method uses two Frame Rate Up-Conversion (FRUC) Modes. One of the FRUC modes is referred to as bilateral matching for B-slice and the other of the FRUC modes is referred as template matching for P-slice or B-slice.

FIG. 1 illustrates an example of FRUC bilateral matching mode, where the motion information for a current block 110 is derived based on two reference pictures. The motion information of the current block is derived by finding the best match between two blocks (120 and 130) along the motion trajectory 140 of the current block in two different reference pictures (i.e., Ref0 and Ref1). Under the assumption of continuous motion trajectory, the motion vectors MV0 associated with Ref0 and MV1 associated with Ref1 pointing to the two reference blocks shall be proportional to the temporal distances, i.e., TD0 and TD1, between the current picture (i.e., Cur pic) and the two reference pictures Ref0 and Ref1.

FIG. 2 illustrates an example of template matching FRUC mode. The neighboring areas (220a and 220b) of the current block 210 in a current picture (i.e., Cur pic) are used as a template to match with a corresponding template (230a and 230b) in a reference picture (i.e., Ref0 in FIG. 2). The best match between template 220a/220b and template 230a/230b will determine a decoder derived motion vector 240. While Ref0 is shown in FIG. 2, Ref1 can also be used as a reference picture.

According to VCEG-AZ07, a FRUC_mrg_flag is signaled when the merge_flag or skip_flag is true. If the FRUC_mrg_flag is 1, then FRUC_merge_mode is signaled to indicate whether the bilateral matching merge mode or template matching merge mode is selected. If the FRUC_mrg_flag is 0, it implies that regular merge mode is used and a merge index is signaled in this case. In video coding, in order to improve coding efficiency, the motion vector for a block may be predicted using motion vector prediction (MVP), where a candidate list is generated. A merge candidate list may be used for coding a block in a merge mode. When the merge mode is used to code a block, the motion information (e.g. motion vector) of the block can be represented by one of the candidates MV in the merge MV list. Therefore, instead of transmitting the motion information of the block directly, a merge index is transmitted to a decoder side. The decoder maintains a same merge list and uses the merge index to retrieve the merge candidate as signaled by the merge index. Typically, the merge candidate list consists of a small number of candidates and transmitting the merge index is much more efficient than transmitting the motion information. When a block is coded in a merge mode, the motion information is "merged" with that of a neighboring block by signaling a merge index instead of the motion information being explicitly transmitted. However, the prediction residuals are still transmitted. In the case that the prediction residuals are zero or very small, the prediction residuals are "skipped" (i.e., the skip mode) and the block is coded by the skip mode with a merge index to identify the merge MV in the merge list.

While the term FRUC refers to motion vector derivation for Frame Rate Up-Conversion, the underlying techniques are intended for a decoder to derive one or more merge MV candidates without the need for explicitly transmitting motion information. Accordingly, the FRUC is also called decoder derived motion information in this disclosure. Since the template matching method is a pattern-based MV derivation technique, the template matching method of the FRUC is also referred as Pattern-based MV Derivation (PMVD) in this disclosure.

In the decoder side MV derivation method, a new temporal MVP called temporal derived MVP is derived by scanning all MVs in all reference frames. To derive the LIST_0 temporal derived MVP, for each LIST_0 MV in the LIST_0 reference frames, the MV is scaled to point to the current frame. The 4×4 block that pointed by this scaled MV in current frame is the target current block. The MV is further scaled to point to the reference picture that refIdx is equal 0 in LIST_0 for the target current block. The further scaled MV is stored in the LIST_0 MV field for the target current block. FIG. 3A and FIG. 3B illustrate examples for deriving the temporal derived MVPs for LIST_0 and LIST_1 respectively. In FIG. 3A and FIG. 3B, each small square block corresponds to a 4×4 block. The temporal derived MVPs process scans all the MVs in all 4×4 blocks in all reference pictures to generate the temporal derived LIST_0 and LIST_1 MVPs of current frame. For example, in FIG. 3A, blocks 310, blocks 312 and blocks 314 correspond to 4×4 blocks of the current picture (Cir. pic), LIST_0 reference picture with index equal to 0 (i.e., refidx=0) and LIST_0 reference picture with index equal to 1 (i.e., refidx=1) respectively. Motion vectors 320 and 330 for two blocks in LIST_0 reference picture with index equal to 1 are known. Then, temporal derived MVP 322 and 332 can be derived by scaling motion vectors 320 and 330 respectively. The scaled MVP is then assigned to a corresponding block. Similarly, in FIG. 3B, blocks 340, blocks 342 and blocks 344 correspond to 4×4 blocks of the current picture (Cir. pic), LIST_1 reference picture with index equal to 0 (i.e., refidx=0) and LIST_1 reference picture with index equal to 1 (i.e., refidx=1) respectively. Motion vectors 350 and 360 for two blocks in LIST_1 reference picture with index equal to 1 are known. Then, temporal derived MVP 352 and 362 can be derived by scaling motion vectors 350 and 360 respectively.

For the bilateral matching merge mode and template matching merge mode, two-stage matching is applied. The first stage is PU-level matching, and the second stage is the sub-PU-level matching. In the PU-level matching, multiple initial MVs in LIST_0 and LIST_1 are selected respectively. These MVs includes the MVs from merge candidates (i.e., the conventional merge candidates such as these specified in the HEVC standard) and MVs from temporal derived MVPs. Two different starting MV sets are generated for two lists. For each MV in one list, a MV pair is generated by composing of this MV and the mirrored MV that is derived by scaling the MV to the other list. For each MV pair, two reference blocks are compensated by using this MV pair. The sum of absolutely differences (SAD) of these two blocks is calculated. The MV pair with the smallest SAD is selected as the best MV pair.

After a best MV is derived for a PU, the diamond search is performed to refine the MV pair. The refinement precision is ⅛-pel. The refinement search range is restricted within ±1 pixel. The final MV pair is the PU-level derived MV pair. The diamond search is a fast block matching motion estimation algorithm that is well known in the field of video coding. Therefore, the details of diamond search algorithm are not repeated here.

For the second-stage sub-PU-level searching, the current PU is divided into sub-PUs. The depth (e.g. 3) of sub-PU is signaled in sequence parameter set (SPS). Minimum sub-PU size is 4×4 block. For each sub-PU, multiple starting MVs in LIST_0 and LIST_1 are selected, which include the MV of PU-level derived MV, zero MV, HEVC collocated TMVP of current sub-PU and bottom-right block, temporal derived MVP of current sub-PU, and MVs of left and above PU/sub-PU. By using the similar mechanism as the PU-level searching, the best MV pair for the sub-PU is determined. The diamond search is performed to refine the MV pair. The motion compensation for this sub-PU is performed to generate the predictor for this sub-PU.

For the template matching merge mode, the reconstructed pixels of above 4 rows and left 4 columns are used to form a template. The template matching is performed to find the best matched template with its corresponding MV. Two-stage matching is also applied for template matching. In the PU-level matching, multiple starting MVs in LIST_0 and LIST_1 are selected respectively. These MVs include the MVs from merge candidates (i.e., the conventional merge candidates such as these specified in the HEVC standard) and MVs from temporal derived MVPs. Two different starting MV sets are generated for two lists. For each MV in one list, the SAD cost of the template with the MV is calculated. The MV with the smallest cost is the best MV. The diamond search is then performed to refine the MV. The refinement precision is ⅛-pel. The refinement search range is restricted within ±1 pixel. The final MV is the PU-level derived MV. The MVs in LIST_0 and LIST_1 are generated independently.

For the second-stage sub-PU-level searching, the current PU is divided into sub-PUs. The depth (e.g. 3) of sub-PU is signaled in SPS. Minimum sub-PU size is 4×4 block. For each sub-PU at left or top PU boundaries, multiple starting MVs in LIST_0 and LIST_1 are selected, which includes MV of PU-level derived MV, zero MV, HEVC collocated TMVP of current sub-PU and bottom-right block, temporal derived MVP of current sub-PU, and MVs of left and above PU/sub-PU. By using the similar mechanism as the PU-level searching, the best MV pair for the sub-PU is determined. The diamond search is performed to refine the MV pair. The motion compensation for this sub-PU is performed to generate the predictor for this sub-PU. For these PUs that are not at left or top PU boundaries, the second-stage sub-PU-level searching is not applied, and the corresponding MVs are set equal to the MVs in the first stage.

In this decoder MV derivation method, the template matching is also used to generate a MVP for Inter mode coding. When a reference picture is selected, the template matching is performed to find a best template on the selected reference picture. Its corresponding MV is the derived MVP. This MVP is inserted into the first position in AMVP. AMVP represents advanced MV prediction and AMVP is a coding tool for coding the motion vector(s) of the current block in Inter coding mode. According to AMVP, a current MV is coded predictively using a motion vector predictor selected from a candidate list. The MV difference between the current MV and a selected MV candidate in the candidate list is coded.

In JVET-D0029 (Xu Chen, et al., "Decoder-Side Motion Vector Refinement Based on Bilateral Template Matching", Joint Video Exploration Team (JVET) of ITU-T SG 16 WP 3 and ISO/IEC JTC 1/SC 29/WG 11, 4th Meeting: Chengdu, CN, 15-21 Oct. 2016, Document: JVET-D0029), Decoder-Side Motion Vector Refinement (DMVR) based on bilateral template matching is disclosed. A template is generated by using the bi-prediction from the reference blocks (410 and 420) of MV0 and MV1, as shown in FIG. 4. In other words, the template for DMVR is formed by combining two reference blocks (i.e., 410 and 420), which is different from the template generated for template matching of PMVP in FIG. 2. Using the template 500 as a new current block and perform the motion estimation to find a better matching block (510 and 520 respectively) in Ref. Picture 0 and Ref. Picture 1, respectively, as shown in FIG. 5. The refined MVs are referred as MV0' and MV1'. The refined MVs (MV0' and MV1') are then used to generate a final bi-predicted prediction block for the current block.

In JVET-C0047 (Chun-Chi Chen, et al., "*Generalized bi-prediction for inter coding*", Joint Video Exploration Team (JVET) of ITU-T SG 16 WP 3 and ISO/IEC JTC 1/SC 29/WG 11, 3rd Meeting: Geneva, CH, 26 May-1 Jun. 2016, Document: JVET-C0047), generalized bi-prediction (GBi) for Inter coding is disclosed. Traditionally, the weighting factors for two predictors in the bi-prediction are equal. However, GBi supports different weighting factors for these two predictors. For example, a larger weighting factor can be used for L0 predictor and a smaller weighting factor can be used for L1 predictor. Alternatively, a larger weighting factor can be used for L1 predictor and a smaller weighting factor can be used for L0 predictor. The set of supported weighting factors can be pre-defined and the selected weighting factor is signaled for bi-prediction Inter CUs or derived based on Merge candidate selection. In JVET-C0047, the set can be {3, 4, 5}, {2, 3, 4, 5, 6} or {−2, 2, 3, 4, 5, 6, 10}.

In JVET-C0047, GBi doesn't support the decoder-side motion derivation Inter coding tools, such as DMVR or PMVD. These decoder-side motion derivation Inter coding tools have been shown to be useful for improving coding performance. Therefore, it is desirable to develop techniques to expand the GBi methods by supporting the decoder-side motion derivation Inter coding tools to further improve GBi coding performance.

BRIEF SUMMARY OF THE INVENTION

Methods and apparatus of video coding using Decoder-Side Motion Vector Refinement (DMVR) or pattern-based MV derivation (PMVD) are disclosed. According to one method, when general bi-prediction (GBi) is used, the reference block 0 and the reference block 1 for DMVR can be combined using an unequal weighting factor pair to form a current template of the current block or a final MVP (motion vector predictor) or a final predictor for DMVR can be generated by combining the refined reference block 0 and the refined reference block 1 using an unequal weighting factor pair. When the MVP candidate is used for Merge candidate list, the unequal weighting factor pair can be determined according to the selection of the Merge candidate. In one embodiment, only the final predictor is formed using an unequal weighting factor pair while the current template is formed using an equal weighting factor pair. In yet another embodiment, the current template of the current block is generated using one unequal weighting factor pair. In yet another embodiment, the unequal weighting factor pair is selected according to a ratio of two distortions calculated as differences between the current template of the current block and the refined reference block 0 and between the current template of the current block and the refined reference block 1 respectively.

In another method, the GBi is extended to PMVD for a block coded in the Merge mode. A Merge candidate list comprising MVP candidates is derived, where at least one motion vector for one MVP candidate is derived using PMVD. If a final MVP candidate selected is a bi-prediction predictor, a weighting factor pair can be selected according to a corresponding weight factor pair of the final MVP candidate selected. A final predictor can be generated by combining two reference blocks associated with two motion vectors of the final MVP candidate using the weighting factor pair selected. If the final MVP candidate selected is the bi-prediction predictor derived using bilateral matching, a first motion vector of the final MVP candidate corresponds to a true motion vector and a second motion vector of the final MVP candidate corresponds to a mirroring motion vector, then a larger weighting factor is used for a first reference block associated with the first motion vector of the final MVP candidate than a second reference block associated with the second motion vector of the final MVP candidate.

According to yet another method, when GBi is used for Merge mode, a new weight factor pair is derived using neighboring reconstructed pixels of the current block and corresponding motion compensated pixels if a final MVP candidate selected is a bi-prediction predictor that uses an unequal weighting factor pair. A final predictor is generated by combining two reference blocks associated with two motion vectors of the final MVP candidate using the new weighting factor pair. If the final MVP candidate selected is a bi-prediction predictor using an equal weighting factor pair, equal weighting is still used to generate the final predictor. The new weight factor pair may be selected among different weighting factor pairs that minimizes a distortion between the neighboring reconstructed pixels of the current block and the corresponding motion compensated pixels. For example, the neighboring reconstructed pixels of the current block may comprise a row of reconstructed pixels above the current block and a column of reconstructed pixels to a left side of the current block.

In still yet another embodiment, the GBi is used with AMVP (advanced motion vector prediction) mode. According to the present invention, a set of weighting factor pairs is determined and the size of the set of weighting factor pairs depends on a block size of the current block. An AMVP candidate list comprising MVP (motion vector prediction) candidates is derived. If a final MVP candidate selected is a bi-prediction predictor, a final predictor is generated by combining two reference blocks associated with two motion vectors of the final MVP candidate using a target weighting factor pair selected from the set of weighting factor pairs. For example, a larger size of the set of weighting factor pairs can be used for a larger block size. In one embodiment, the set of weighting factor pairs comprises only one equal weighting factor pair if the block size of the current block is smaller than a threshold size. Information related to block-size dependency for the size of the set of weighting factor pairs can be signaled or pre-defined in a sequence level, picture level or slice level of a video bitstream.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In the present invention, several methods to allow generalized bi-prediction (GBi) to take advantage of the better coding performance from the decoder-side motion derivation Inter coding tools, such as Decoder-Side Motion Vector Refinement (DMVR) or pattern-based MV derivation (PMVD).

Method 1: Combining GBi with DMVR

Figure 1:
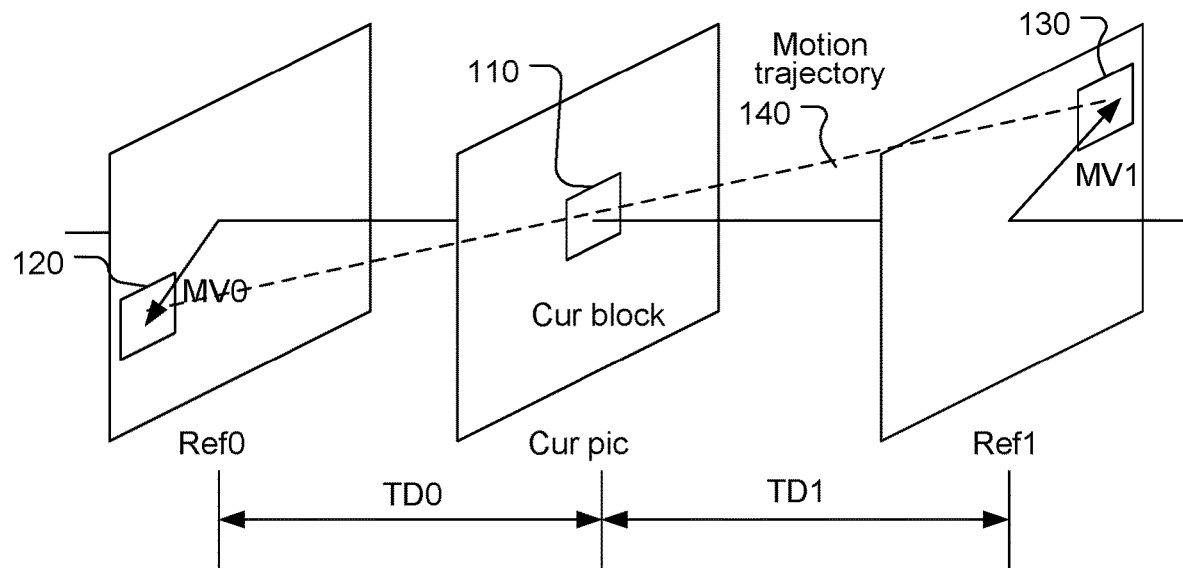
FIG. 1 illustrates an example of motion compensation using the bilateral matching technique, where a current block is predicted by two reference blocks along the motion trajectory.
Figure 2:
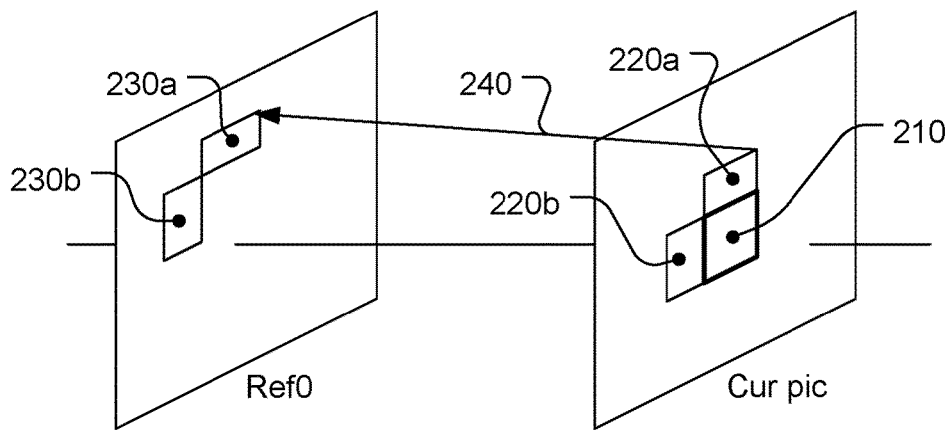
FIG. 2 illustrates an example of motion compensation using the template matching technique, where the template of the current block is matched with the reference template in a reference picture.
Figure 3A:
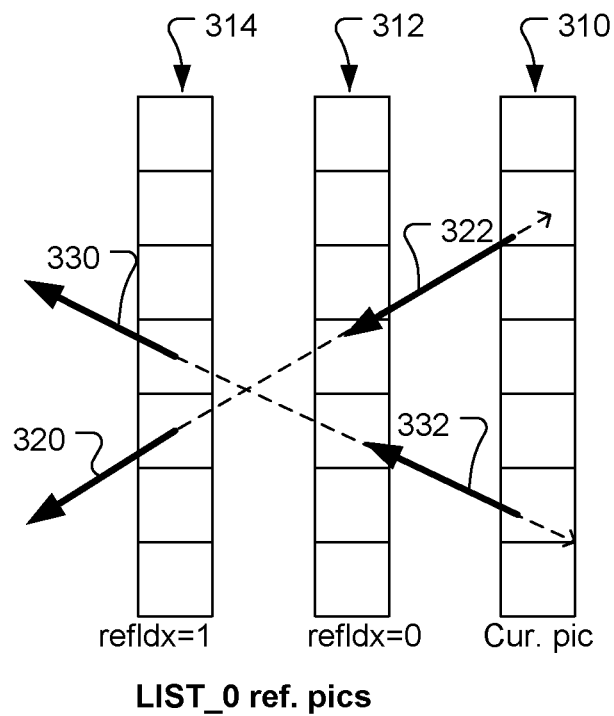
FIG. 3A illustrates an example of temporal motion vector prediction (MVP) derivation process for LIST_0 reference pictures.
Figure 3B:
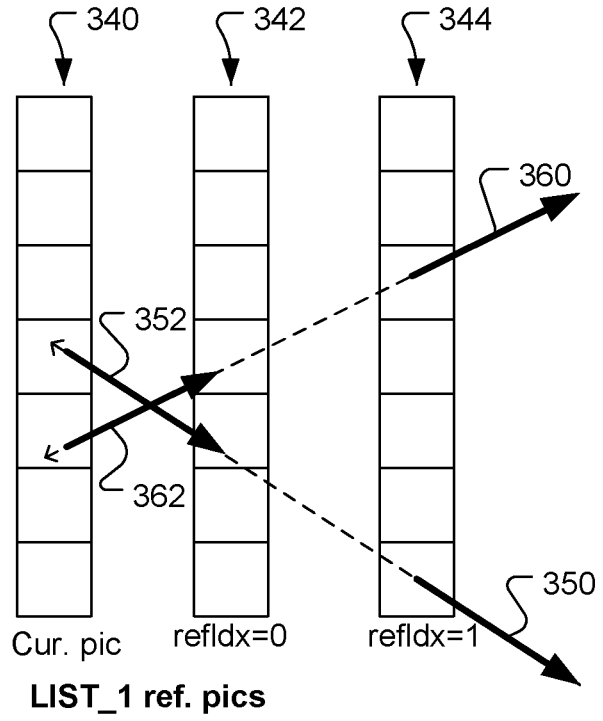
FIG. 3B illustrates an example of temporal motion vector prediction (MVP) derivation process for LIST_1 reference pictures.
Figure 4:
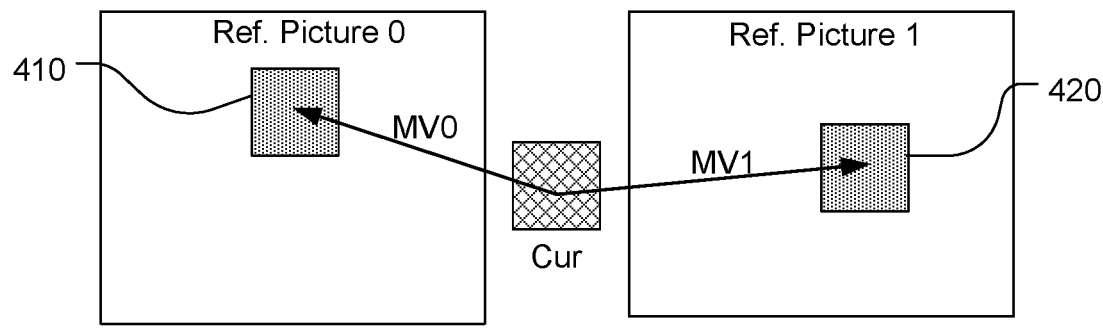
FIG. 4 illustrates an example of Decoder-Side Motion Vector Refinement (DMVR), where a template is generated by using the bi-prediction from the reference blocks (410 and 420) associated with initial motion vectors, MV0 and MV1.
Figure 5:
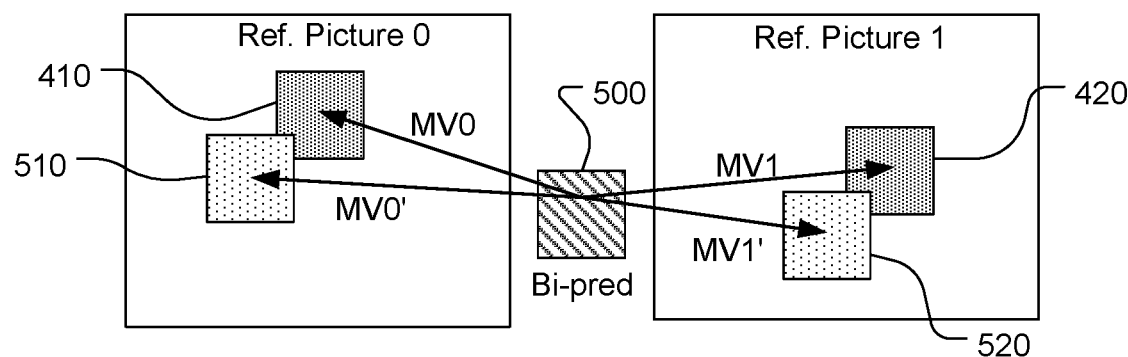
FIG. 5 illustrates an example of Decoder-Side Motion Vector Refinement (DMVR) by using the template generated in FIG. 4 as a new current block and performing the motion estimation to find a better matching block in Ref. Picture 0 and Ref. Picture 1 respectively.

According to JVET-C0047 and JVET-D0029, only the equal weighting factor is supported in DMVR. In order to support GBi in DMVR, when DMVR is enabled, different weighting factors can be used according to the present method. In one embodiment, DMVR is applied for the Merge mode, and the weighting factor pair selection is derived from Merge candidate. In this case, the selected weighting factor pair will only be applied to generate the final predictor without changing the refinement process. As is known for DMVR, a pair of refined motion vectors (i.e., MV0' and MV1' in FIG. 5) are derived based on the current template. An unequal weighting factor pair is applied to the refined reference blocks (i.e., blocks 510 and 520 in FIG. 5). Furthermore, the current template is derived by combining the two initial reference blocks (i.e., blocks 410 and 420 in FIG. 4 or FIG. 5). In this embodiment, the current template is derived using the conventional method (i.e., using equal weighting) so that the refinement process stays the same as the conventional method. In another embodiment, the selected weighting factor can also be further used to generate the template for motion vector refinement. In other words, an unequal weighting factor pair can be applied to the two initial reference blocks to generate the template for the current block. In yet another embodiment, the final predictor is generated by using the ratio between two distortions, which are calculated as the differences between the final reference blocks and template respectively, when an unequal-weighting factor pair is used. In other words, a first distortion is calculated as the differences between the first refined reference block (i.e., block 510 in FIG. 5) associated with the first refined motion vector MV0' and the template (500) of the current block. A second distortion is calculated as the differences between the second refined reference block (i.e., block 520 in FIG. 5) associated with the second refined motion vector MV1' and the template (500) of the current block. By determining the ratio of the two distortions, a proper weighting factor pair can be selected. For example, if the first distortion is much larger than the second distortion, the first weighting factor of the selected weighting factor pair is much larger than the second weighting factor of the selected weighting factor pair.

Method 2: Combining GBi with PMVD

According to NET-C0047 and VCEG-AZ07, only the equal weighting factor is supported in PMVD. In order to extend GBi on the PMVD mode in one embodiment, the weighting factors can be derived based on the selection among Merge candidates. For example, in template matching, if the best Merge candidate is the first Merge candidate, the weighting factor of this Merge candidate will be used to generate the final predictor. For example, if MV0 is the selected first MV in bilateral matching and the weighting factor of L0 is 5, then the weighting factor pair equal to (5, 3) is applied. As another example, in bilateral matching, if the best candidate is the MV1 in L1 of the second Merge candidate, the weighting factor (e.g. 3) of L1 in this Merge candidate is used to generate the final predictor (i.e., weighting factor pair (5,3) in this example). In another embodiment, since only one MV is true MV and the other is generated by using mirroring method in bilateral matching, a larger weighting factor is always assigned to the reference block pointed by the true MV. For example, if MV0 is the selected true MV in bilateral matching, then the weighting factor of L0 is 5, and the weighting factor pair equal to (5, 3) is applied.

Method 3: GBi Improvement for Merge Mode

According to the existing method, if one CU is coded in Merge mode, the weighting factors are derived based on Merge candidate selection. According to a method of the present invention, if the weighting factors of the selected Merge candidates are equal, then the equal-weighting factor is applied to form the predictor for the current block. Otherwise, if the weighting factors of the selected merge candidates are unequal, then the weighting factors are derived by using neighboring reconstructed pixels and corresponding motion compensated pixels. For example, the distortions between neighboring reconstructed pixels at the above row and left column of the current CU and corresponding motion compensated pixels in reference blocks can be calculated with different weighting factors. The best weighting factor pair among different weighting factor pairs is selected. The best weighting factor pair may correspond to one weighting factor pair that achieves the minimum distortion.

Method 4: GBi Improvement for Signaling

According to existing method, the selection of weighting factor is signaled for AMVP (adaptive motion vector prediction) coded CUs. However, as the CU size becomes larger, the overhead of signaling one index becomes smaller. Therefore, a method is disclosed, where the supported weighting factors are dependent on the CU size. For example, for CUs with size larger than 64×64, 5 different kinds of weighting factor pairs can be used. If CU size is smaller than 64×64, but larger than 8×8, then only 3 kinds of weighting factor pairs can be supported. If CU size is smaller than 8×8, then only equal-weighing factor can be used. In other words, only one weighting factor pair is allowed in this case. The CU size constraints and supported weighting factor pairs for different CU sizes can be predefined or signaled at sequence, picture or slice level.

Figure 6:
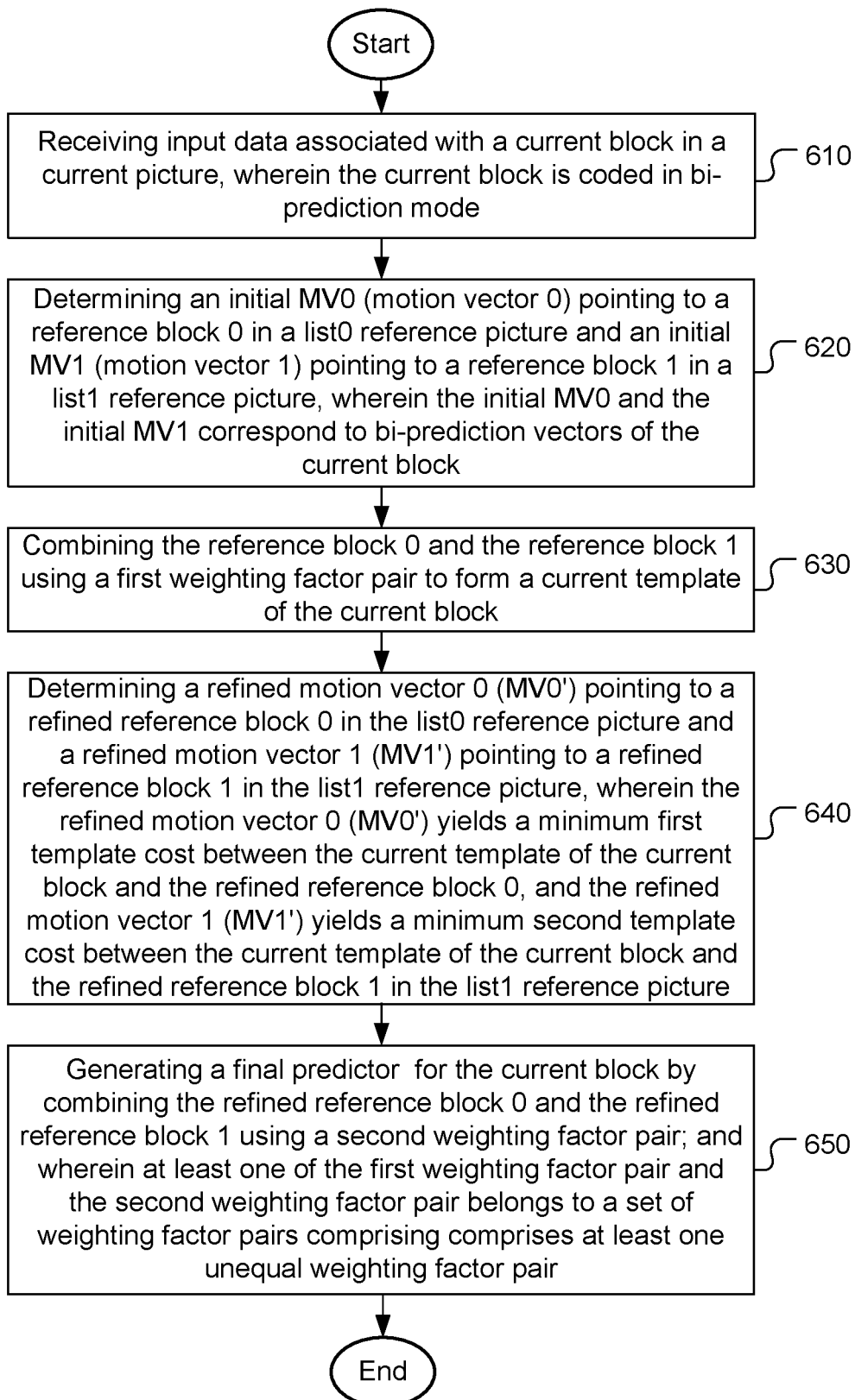
FIG. 6 illustrates an exemplary flowchart of a video coding system using Decoder-Side Motion Vector Refinement (DMVR) and generalized bi-prediction according to an embodiment of the present invention.

FIG. 6 illustrates an exemplary flowchart of a video coding system using Decoder-Side Motion Vector Refinement (DMVR) and generalized bi-prediction according to an embodiment of the present invention. The steps shown in the flowchart, as well as other flowcharts in this disclosure, may be implemented as program codes executable on one or more processors (e.g., one or more CPUs) at the encoder side and/or the decoder side. The steps shown in the flowchart may also be implemented based on hardware such as one or more electronic devices or processors arranged to perform the steps in the flowchart. According to this method, input data associated with a current block in a current picture is received in step 610, where the current block is coded in bi-prediction mode. An initial MV0 (motion vector 0) pointing to a reference block 0 in a list0 reference picture and an initial MV1 (motion vector 1) pointing to a reference block 1 in a list1 reference picture are determined in step 620, where the initial MV0 and the initial MV1 correspond to bi-prediction vectors of the current block. The reference block 0 and the reference block 1 are combined using a first weighting factor pair to form a current template of the current block in step 630. A refined motion vector 0 (MV0') pointing to a refined reference block 0 in the list0 reference picture and a refined motion vector 1 (MV1') pointing to a refined reference block 1 in the list1 reference picture are determined in step 640, where the refined motion vector 0 (MV0') yields a minimum first template cost between the current template of the current block and the refined reference block 0, and the refined motion vector 1 (MV1') yields a minimum second template cost between the current template of the current block and the refined reference block 1 in the list1 reference picture. A final predictor for the current block is generated by combining the refined reference block 0 and the refined reference block 1 using a second weighting factor pair in step 650, where at least one of the first weighting factor pair and the second weighting factor pair belongs to a set of weighting factor pairs comprising at least one unequal weighting factor pair.

Figure 7:
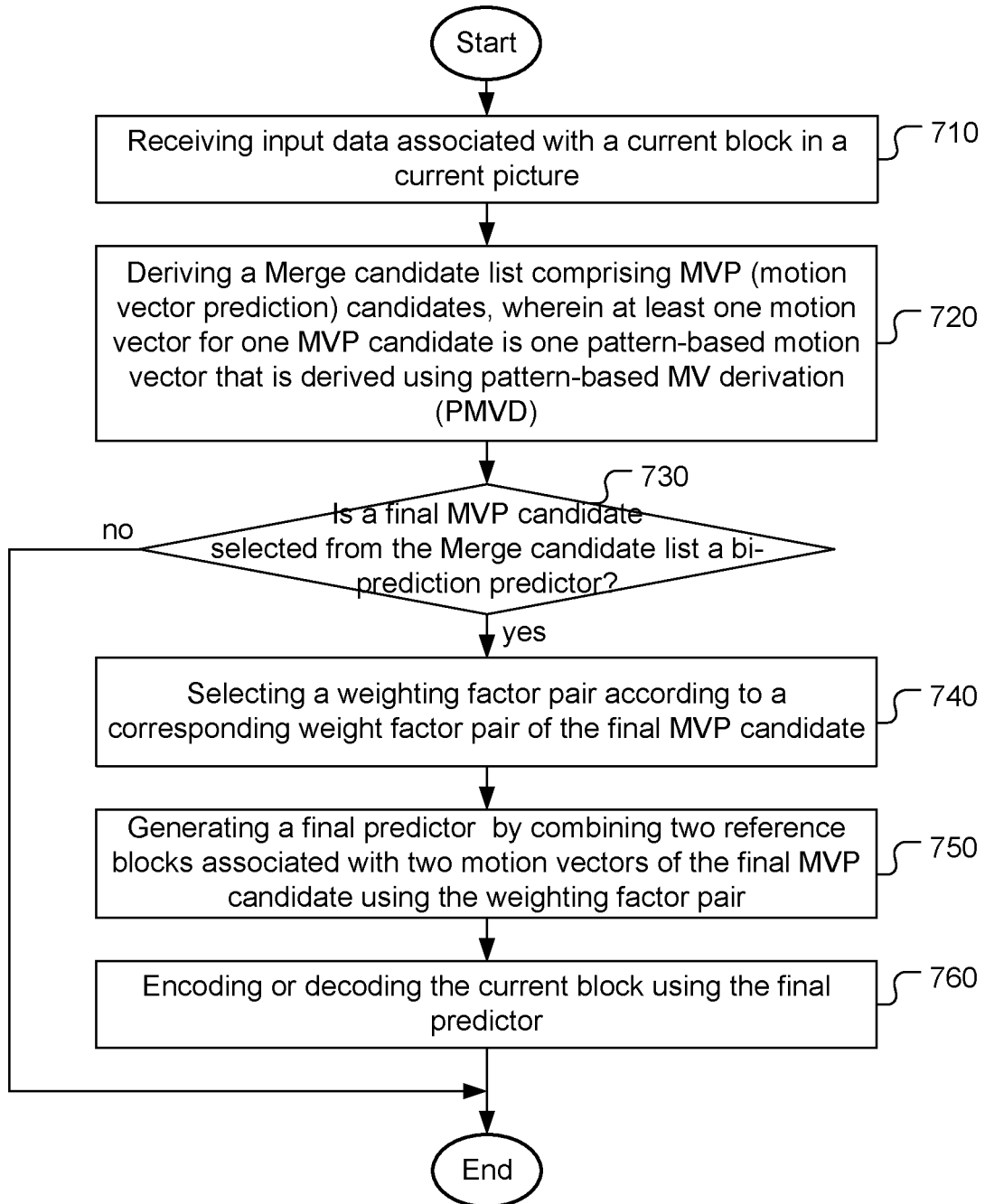
FIG. 7 illustrates an exemplary flowchart of a video coding system using pattern-based MV derivation (PMVD) and generalized bi-prediction according to an embodiment of the present invention.

FIG. 7 illustrates an exemplary flowchart of a video coding system using pattern-based MV derivation (PMVD) and generalized bi-prediction according to an embodiment of the present invention. Input data associated with a current block in a current picture are received in step 710. A Merge candidate list comprising MVP (motion vector prediction) candidates is derived in step 720, where at least one motion vector for one MVP candidate is one pattern-based motion vector that is derived using pattern-based MV derivation (PMVD). Whether a final MVP candidate selected is a bi-prediction predictor is checked in step 730. If the result is "yes", steps 740-760 are performed. Otherwise (i.e., the "no" path from step 730), steps 740-760 are skipped. In step 740, a weighting factor pair is selected according to a corresponding weight factor pair of the final MVP candidate selected. In step 750, a final predictor is generated by combining two reference blocks associated with two motion vectors of the final MVP candidate using the weighting factor pair. In step 760, the current block is encoded or decoded using the final predictor.

Figure 8:
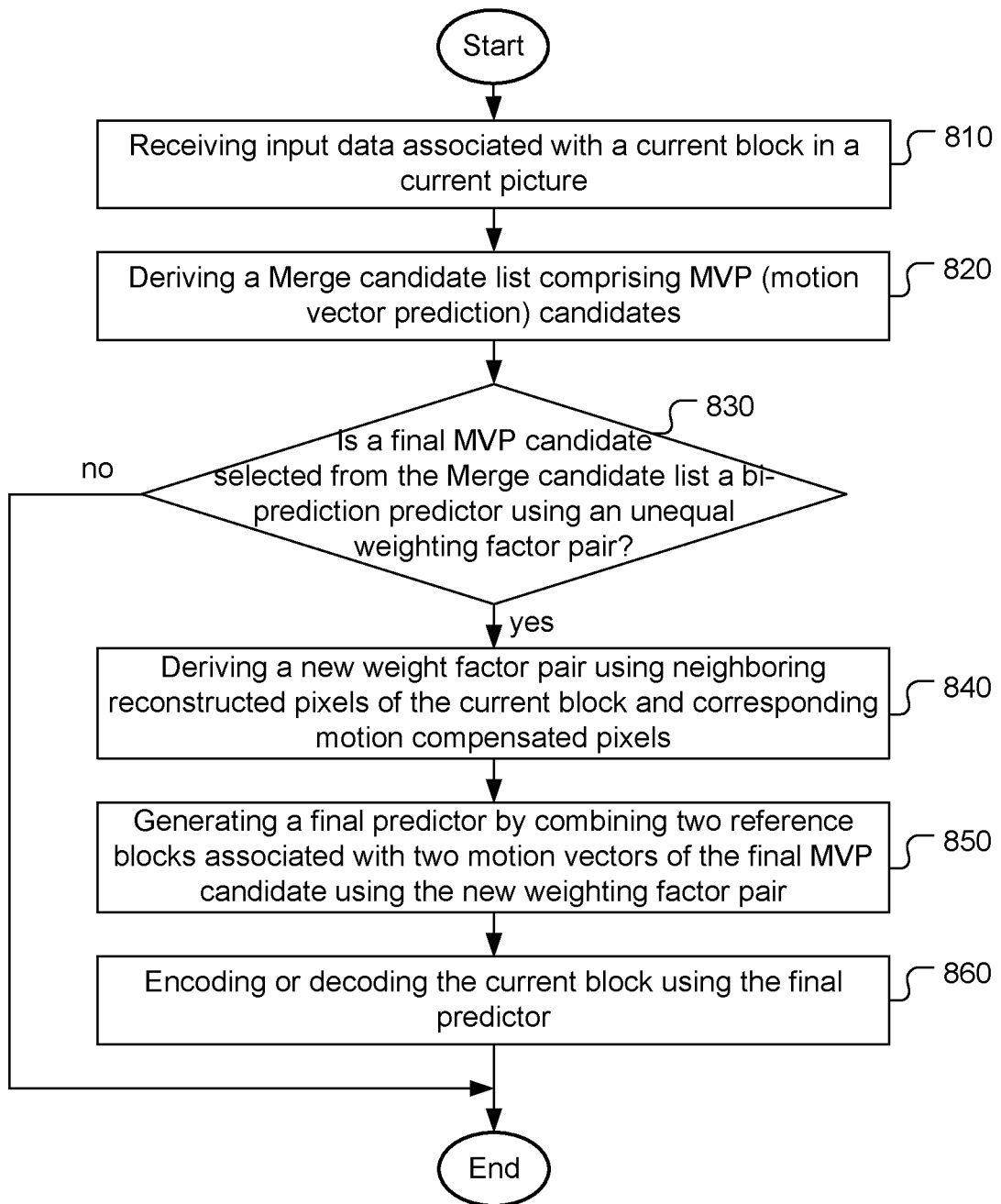
FIG. 8 illustrates an exemplary flowchart of a video coding system using generalized bi-prediction according to an embodiment of the present invention, where a new weighting factor pair is used for a block coded using the Merge mode and the selected Merge MVP candidate corresponds to bi-prediction with an unequal weighting factor pair.

FIG. 8 illustrates an exemplary flowchart of a video coding system using generalized bi-prediction according to an embodiment of the present invention, where a new weighting factor pair is used for a block coded using the Merge mode and the selected Merge MVP candidate corresponds to bi-prediction with an unequal weighting factor pair. Input data associated with a current block in a current picture are received in step 810. A Merge candidate list comprising MVP (motion vector prediction) candidates is derived in step 820. Whether a final MVP candidate selected is a bi-prediction predictor using an unequal weighting factor pair is checked in step 830. If the result is "yes", steps 840-860 are performed. Otherwise (i.e., the "no" path from step 830) steps 840-860 are skipped. In step 840, a new weight factor pair is derived using neighboring reconstructed pixels of the current block and corresponding motion compensated pixels. In step 850, a final predictor is generated by combining two reference blocks associated with two motion vectors of the final MVP candidate using the new weighting factor pair. In step 860, the current block is encoded or decoded using the final predictor.

Figure 9:
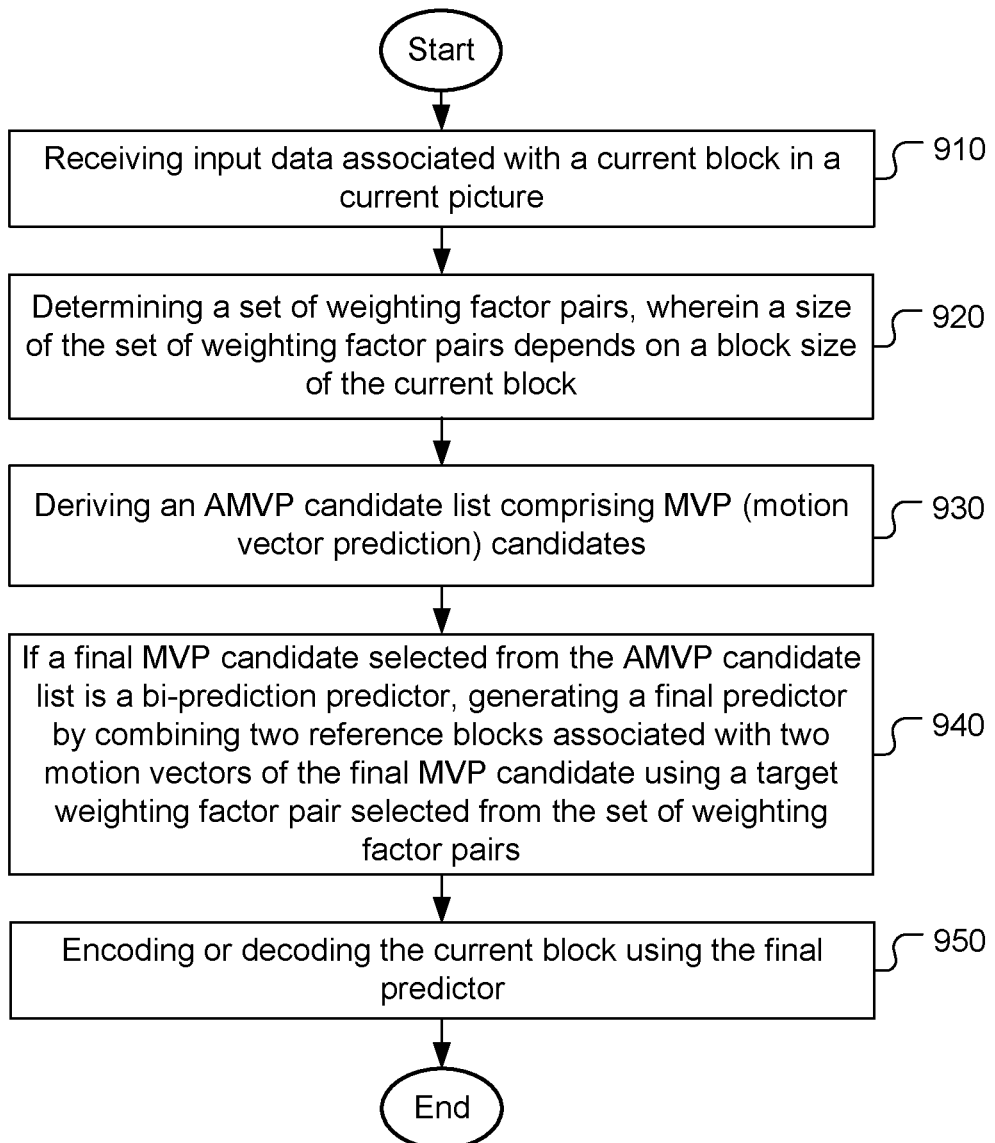
FIG. 9 illustrates an exemplary flowchart of a video coding system using generalized bi-prediction according to an embodiment of the present invention, wherein the size of the set of weighting factor pairs is dependent on the block size of the current block.

FIG. 9 illustrates an exemplary flowchart of a video coding system using generalized bi-prediction according to an embodiment of the present invention, wherein the size of the set of weighting factor pairs is dependent on the block size of the current block. Input data associated with a current block in a current picture are received in step 910. A set of weighting factor pairs is determined in step 920, wherein a size of the set of weighting factor pairs depends on a block size of the current block. An AMVP candidate list comprising MVP (motion vector prediction) candidates are derived in step 930. If a final MVP candidate selected is a bi-prediction predictor, a final predictor is generated by combining two reference blocks associated with two motion vectors of the final MVP candidate using a target weighting factor pair selected from the set of weighting factor pairs in step 940. The current block is encoded or decoded using the final predictor in step 950.

The flowcharts shown above are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method, comprising:

while using generalized bi-prediction (GBi):

receiving input data associated with a current block in a current picture, wherein the input data comprises information associated with a block size of the current block;

determining a set of weighting factor pairs, wherein a size of the set of weighting factor pairs depends on the block size of the current block;

deriving a set of advanced motion vector prediction (AMVP) candidate lists comprising MVP (motion vector prediction) candidates;

deriving a set of final motion information based on the MVP candidates;

determining that the set of final information comprises a bi-prediction predictor;

generating a final predictor by combining two reference blocks associated with the final motion information using a target weighting factor pair selected from the set of weighting factor pairs; and encoding or decoding the current block using the final predictor, wherein a size of the set of weighting factor pairs is one of at least a first size or a second size, wherein the first size is based on a first block size smaller than a threshold size, and the second size is based on a second block size greater than or equal to the threshold size, wherein the second size is larger than the first size.

2. The method of claim 1, wherein determining a set of weighting factor pairs further comprising:

deciding the block size of the current block is greater than or equal to a threshold size; and deciding the set of weighting factor pairs having different weighting factor pairs which indicates the size of the set of weighting factor pairs is more than one.

3. The method of claim 1, wherein determining a set of weighting factor pairs further comprising:

deciding the block size of the current block is smaller than a threshold size; and deciding the set of weighting factor pairs having only one equal weighting factor pair which indicates the size of the set of weighting factor pairs is equal to one.

4. The method of claim 1, wherein determining that the set of final information comprises a bi-prediction predictor comprises deriving an inter prediction index that indicates bi-prediction, and wherein deriving a set of final motion information comprises:

deriving reference frame indices (refidx) according to the inter prediction index; and deriving a plurality of motion vectors based on the reference frame indices.

5. The method of claim 1, wherein information related to block-size dependency for the size of the set of weighting factor pairs is signaled or pre-defined in a sequence level, picture level or slice level of a video bitstream.

* * * * *